United States Patent
Kalhan

(10) Patent No.: US 12,046,142 B2
(45) Date of Patent: Jul. 23, 2024

(54) LOCAL BROADCAST DURING IDLE STATE OF USER EQUIPMENT DEVICE TO TRIGGER COLLISION-AVOIDANCE PROCEDURE

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 73 days.

(21) Appl. No.: 17/790,902

(22) PCT Filed: Jan. 15, 2021

(86) PCT No.: PCT/US2021/013548
§ 371 (c)(1),
(2) Date: Jul. 5, 2022

(87) PCT Pub. No.: WO2021/146501
PCT Pub. Date: Jul. 22, 2021

(65) Prior Publication Data
US 2023/0040797 A1    Feb. 9, 2023

Related U.S. Application Data

(60) Provisional application No. 62/961,825, filed on Jan. 16, 2020.

(51) Int. Cl.
| | |
|---|---|
| *G08G 1/16* | (2006.01) |
| *G08G 1/09* | (2006.01) |
| *H04W 4/02* | (2018.01) |
| *H04W 4/021* | (2018.01) |
| *H04W 4/06* | (2009.01) |

(Continued)

(52) U.S. Cl.
CPC ............ *G08G 1/164* (2013.01); *G08G 1/091* (2013.01); *G08G 1/16* (2013.01); *G08G 1/166* (2013.01); *H04W 4/021* (2013.01); *H04W 4/025* (2013.01); *H04W 4/06* (2013.01); *H04W 4/40* (2018.02); *H04W 4/44* (2018.02); *H04W 4/90* (2018.02)

(58) Field of Classification Search
CPC .................................. G08G 1/16; H04W 4/40
See application file for complete search history.

(56) References Cited

U.S. PATENT DOCUMENTS

| | | |
|---|---|---|
| 9,736,847 B2 | 8/2017 | Feng et al. |
| 10,129,842 B2 | 11/2018 | Jeong et al. |

(Continued)

*Primary Examiner* — John A Tweel, Jr.

(57) ABSTRACT

The methods, devices, and systems discussed herein periodically broadcast a signal containing an indicator to a first area that is near a potential safety scenario, such as an intersection. In some examples, the broadcast signal is part of a Synchronization System Block (SSB). In other examples, the broadcast signal is a System Information Block (SIB) message. Upon entering the first area and waking from an IDLE state, a mobile wireless communication device (WCD) receives the broadcast signal. In response to receiving the broadcast signal, the WCD activates a collision-avoidance procedure. In some examples, the collision-avoidance procedure includes sensing device-to-device (D2D) resources in order to detect D2D transmissions from an approaching D2D-capable device (e.g., a vehicle). In other examples, the collision-avoidance procedure includes transmitting a periodic D2D safety message using D2D resources.

17 Claims, 5 Drawing Sheets

(51) Int. Cl.
  *H04W 4/40*   (2018.01)
  *H04W 4/44*   (2018.01)
  *H04W 4/90*   (2018.01)

(56) References Cited

U.S. PATENT DOCUMENTS

2012/0236841 A1* 9/2012 Nakaoka ................ G08G 1/161
                                               370/345
2017/0325167 A1  11/2017 Lu et al.
2018/0184442 A1   6/2018 Bai et al.
2018/0302768 A1* 10/2018 Uchiyama ......... H04W 52/0216
2019/0200296 A1   6/2019 Liu et al.
2023/0031495 A1*  2/2023 Chang ............... H04W 52/0216

* cited by examiner

LOCAL BROADCAST DURING IDLE STATE OF USER EQUIPMENT DEVICE TO TRIGGER COLLISION-AVOIDANCE PROCEDURE

CLAIM OF PRIORITY

The present application claims the benefit of priority to Provisional Application No. 62/961,825, entitled "Local Broadcast for Vulnerable Road User Safety", filed Jan. 16, 2020, assigned to the assignee hereof and hereby expressly incorporated by reference in its entirety.

FIELD

This invention generally relates to wireless communications and more particularly to local broadcasts of a signal containing an indicator.

BACKGROUND

There is a benefit when information is provided to vulnerable road users (e.g., pedestrians or cyclists) regarding the presence of moving vehicles. More specifically, providing warnings to vulnerable road users may advantageously prevent collisions with moving vehicles.

SUMMARY

The methods, devices, and systems discussed herein periodically broadcast a signal containing an indicator to a first area that is near a potential safety scenario, such as an intersection. In some examples, the broadcast signal is part of a Synchronization System Block (SSB). In other examples, the broadcast signal is a System Information Block (SIB) message. Upon entering the first area and waking from an IDLE state, a mobile wireless communication device (WCD) receives the broadcast signal. In response to receiving the broadcast signal, the WCD activates a collision-avoidance procedure. In some examples, the collision-avoidance procedure includes sensing device-to-device (D2D) resources in order to detect D2D transmissions from an approaching D2D-capable device (e.g., a vehicle). In other examples, the collision-avoidance procedure includes transmitting a periodic D2D safety message using D2D resources.

DETAILED DESCRIPTION

Figure 1A:
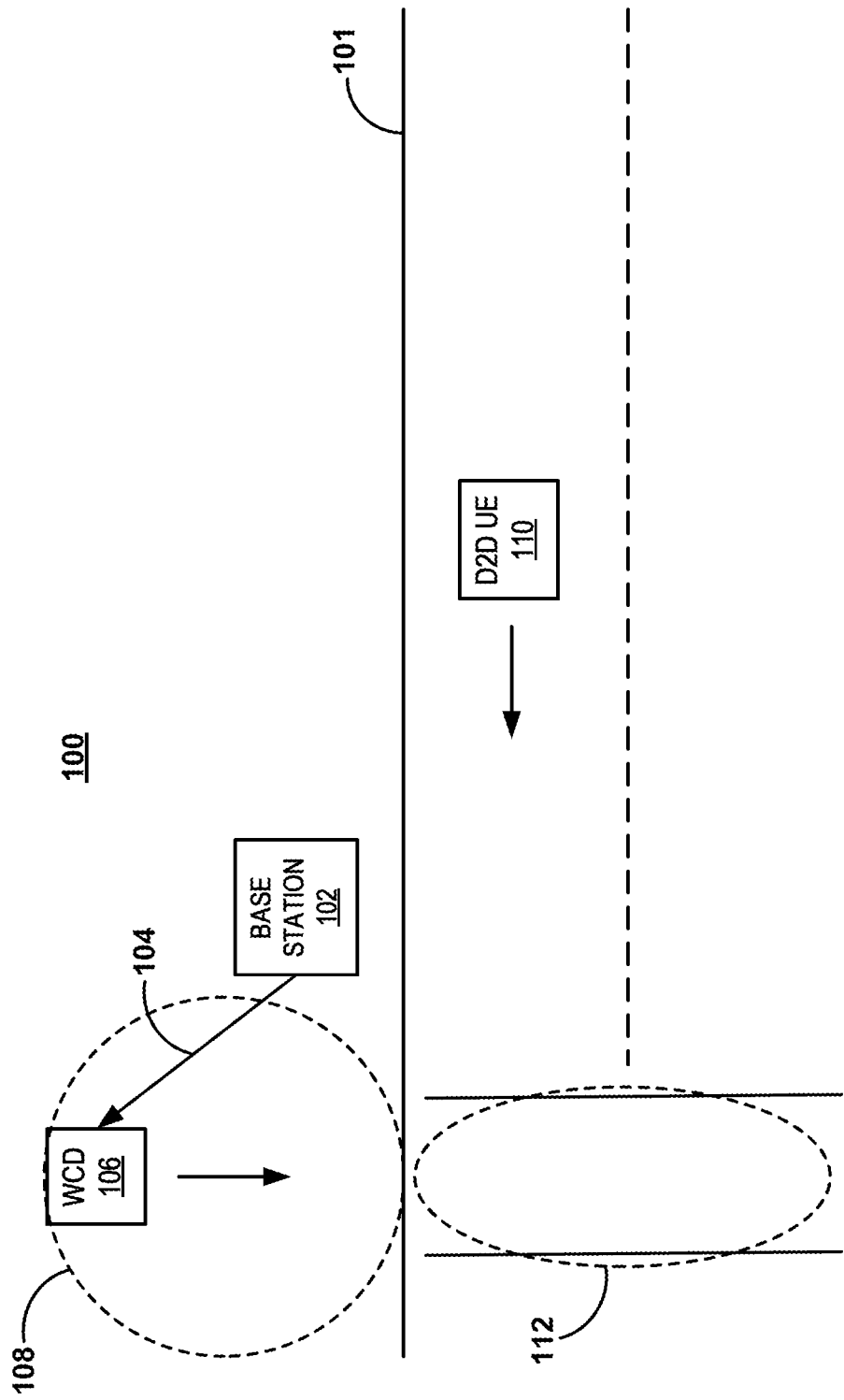
FIG. 1A is a block diagram of an example of a system in which a mobile wireless communication device receives, upon entering a first area and waking from an IDLE state, a broadcast signal that triggers the mobile wireless communication device to activate a collision-avoidance procedure.

The examples described herein are generally directed to providing warnings to vulnerable road users (e.g., pedestrians or cyclists) regarding the presence of moving objects (e.g., vehicles, drones, robots, etc.). These warnings may advantageously prevent collisions between the vulnerable road users and the moving objects.

For example, consider the scenario in which a pedestrian is about to cross a street by using a crosswalk at an intersection and an approaching vehicle is about to pass through the same crosswalk. In this situation, a vehicle user equipment device (VUE) located within the vehicle transmits a warning message using device-to-device (D2D) communication resources. The pedestrian user equipment device (PUE) receives the warning message, if the PUE is monitoring all available D2D communication resources. Although effective, this method is inefficient, from a battery-consumption point of view, since the PUE must constantly remain powered on to monitor all of the available D2D communication resources.

In order to save battery power, the PUE can be configured to (1) perform periodic monitoring of selected D2D communication resources (e.g., partial sensing method), and (2) go to sleep in between the sensing durations (e.g., periods). The VUEs are configured to transmit their warning messages using only the selected D2D communication resources that are being periodically monitored by the PUE. Although the PUE monitors a smaller subset of D2D communication resources, this method still does not significantly reduce the power consumption required by the PUE to monitor the D2D communication resources. More specifically, the PUE must periodically wake-up from its sleep state, resynchronize, and then detect the VUE's warning messages. Besides the inefficient battery consumption, this method is also not suitable in situations when latency is critical. For example, the periodicity of the selected D2D communication resources could be too long for many collision-avoidance scenarios.

As an alternative to the VUEs transmitting warning messages, the PUEs could broadcast warning messages using the first available D2D communication resource. Since the VUEs have no battery consumption constraint, they can continuously monitor all of the D2D communication resources. For example, a PUE would transmit a warning message when it gets close to a potentially hazardous situation (e.g., before reaching a street crossing). This warning message would provide safety-related information such as the PUE's location and heading. Once the PUE is no longer in or near a potentially hazardous situation (e.g., the pedestrian is done crossing the street), the PUE stops transmitting the warning message. However, this method would require the PUE to be constantly aware of its geo-location, which would require the PUE's power-consuming, global positioning system (GPS) receiver or other geo-location determination hardware to stay active.

Instead of the PUE determining its geo-location, an improvement to the above method is for the network to send a warning message to the PUE using the cellular link (Uu-link), which would trigger the PUE to transmit a location/heading safety message over D2D communication resources. For example, if a road sensor (e.g., camera, radar, etc.) detects a pedestrian, the road sensor notifies the cellular network. After receiving the notification, a gNB (e.g., base station) of the cellular network broadcasts a paging message to an area in which the PUE is located. In other examples, the gNB transmits the paging message to one or more PUEs via a unicast or multicast transmission. Regardless of how the paging message is transmitted, the paging message contains an indicator, which instructs the PUE to activate a collision-avoidance procedure. In some examples, the collision-avoidance procedure includes transmitting a D2D location/heading safety message.

The near-by VUEs receive this safety message and take the appropriate steps to avoid collision. Although this method reduces the PUE's battery-consumption, the method has a large delay due to the road sensor detection processing, road sensor accessing the network, network processing, and the network paging the PUE. Moreover, the network must wait to page the PUE when the PUE wakes up from its sleep cycle. In some examples, all of these added delays are unacceptable, especially for safety-related applications. Therefore, there is a need to reduce this delay.

Some of the examples described herein are configured to operate in conjunction with the IDLE state procedure of the 3rd Generation Partnership Project 5G New Radio (3GPP 5G NR) communication specification. As part of the 3GPP 5G NR IDLE state procedure, a user equipment device (UE) sleeps for a time-period to reduce battery consumption and periodically wakes up to receive a paging message. If the UE does not receive a paging message, the UE goes back to sleep until the next wake up time. This sleep cycle is also known as discontinuous reception (DRX).

The basic mechanism for DRX is a configurable DRX cycle in the UE. With a DRX cycle configured, the UE monitors the downlink control signaling only when active, sleeping with the receiver circuitry switched off (e.g., in an IDLE state) when not active. This allows for a significant reduction in power consumption: the longer the cycle, the lower the power consumption.

Naturally, this implies restrictions to the scheduler as the UE can be addressed only when active, according to the DRX cycle. Thus, a (long) DRX cycle in combination with the UE remaining awake for some period after being scheduled is sufficient for most scenarios. However, some services, most notably Voice over Internet Protocol (VoIP), are characterized by periods of regular transmission, followed by periods of no or very little activity.

To handle these services, a short DRX cycle can optionally be used in addition to the long cycle described above. Normally, the UE follows the long DRX cycle, but if it has recently been scheduled, the UE will follow a shorter DRX cycle for some time. Handling VoIP in this scenario can be done by setting the short DRX cycle to 20 ms, as the voice codec typically delivers a VoIP packet once every 20 ms. The long DRX cycle is then used to handle longer periods of silence when the UE is not receiving VoIP packets.

Upon waking from an IDLE state (e.g., sleep state), the UE attempts to detect the last serving cell's Synchronization Signal Block (SSB) to receive the paging message. In the context of 3GPP 5G NR, the SSB is comprised of a primary synchronization signal (PSS), a secondary synchronization signal (SSS), and a downlink physical broadcast channel (PBCH). The PSS and SSS are a pair of downlink signals that are used by UEs to find, identify, and synchronize to a network. The PBCH is transmitted together with the PSS/SSS and carries a minimum amount of system information including an indication where the remaining broadcast system information is transmitted. The PSS, SSS, and PBCH are jointly referred to as the SSB.

Besides attempting to detect the last serving cell's SSB upon waking, the UE may also attempt to detect one or more neighboring cell's SSBs, as well. If successfully detected, the UE adds the detected SSBs of the neighboring cells to a list of candidate cells. The UE maintains the list of candidate cells in order to perform a handover to another cell when the downlink signal of one of the candidate cells has a stronger received signal strength than the downlink signal of the serving cell. Since the UE may have performed a reselection to another cell, the network is not aware of the exact cell the UE is camping on during its IDLE state. Thus, when the network needs to page a UE, the network will send the page to a group of cells in case the UE has performed a handover to a neighboring cell during the IDLE state of the UE.

The methods, devices, and systems discussed herein periodically broadcast a signal containing an indicator to a first area that is near a potential safety scenario, such as an intersection. Upon entering the first area and waking from an IDLE state, a mobile wireless communication device (e.g., a PUE) receives the broadcast signal. In some examples, the broadcast signal is part of an SSB. In other examples, the broadcast signal is a System Information Block (SIB) message.

In response to receiving the broadcast signal, the PUE activates a collision-avoidance procedure. In some examples, the collision-avoidance procedure includes sensing device-to-device (D2D) resources in order to detect D2D transmissions from an approaching D2D-capable device (e.g., a vehicle containing a VUE). In other examples, the collision-avoidance procedure includes transmitting a periodic D2D safety message using D2D resources.

Although the different examples described herein may be discussed separately, any of the features of any of the examples may be added to, omitted from, or combined with any other example. Similarly, any of the features of any of the examples may be performed in parallel or performed in a different manner/order than that described or shown herein.

FIG. 1A is a block diagram of an example of system 100 in which a mobile wireless communication device receives, upon entering a first area and waking from an IDLE state, a broadcast signal that triggers the mobile wireless communication device to activate a collision-avoidance procedure. For the example of FIG. 1A, base station 102 is located near roadway 101. Base station 102, also referred to as a gNB, operates in accordance with at least one revision of the 3rd Generation Partnership Project 5G New Radio (3GPP 5G NR) communication specification. In other examples, base station 102 may operate in accordance with other communication specifications. In still further examples, a local remote radio head (RRH), a UE-type or gNB-type road side unit (RSU), a D2D-capable device, or any other suitable device can be used in place of base station 102 to perform the functions described herein.

In the interest of brevity, FIG. 1A only depicts one base station and one WCD. However, any number of base stations may be utilized to accommodate the safety requirements of a particular area. Likewise, any number of WCDs may be serviced by the base stations.

Figure 2A:
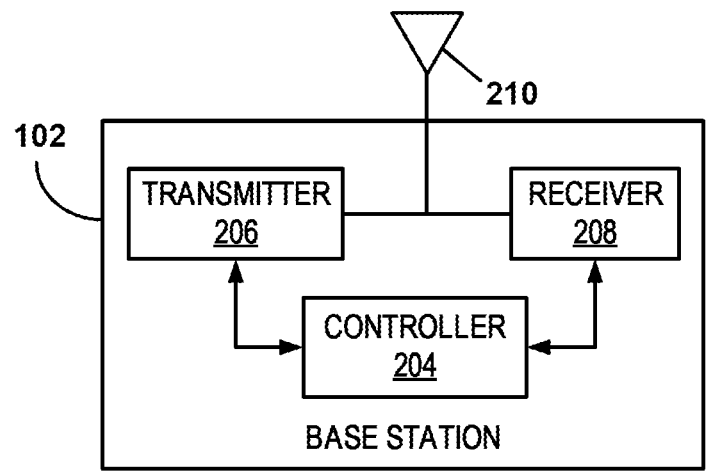
FIG. 2A is a block diagram of an example of the base station shown in FIG. 1A.

As shown in FIG. 2A, base station 102 comprises controller 204, transmitter 206, and receiver 208, as well as other electronics, hardware, and code. Base station 102 is any fixed, mobile, or portable equipment that performs the functions described herein. The various functions and operations of the blocks described with reference to base station 102 may be implemented in any number of devices, circuits, or elements. Two or more of the functional blocks may be integrated in a single device, and the functions described as performed in any single device may be implemented over several devices.

For the example shown in FIG. 2A, base station 102 may be a fixed device or apparatus that is installed at a particular location at the time of system deployment. Examples of such equipment include fixed base stations or fixed transceiver stations. In some situations, base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, base station 102 may be a portable device that is not fixed to any particular location. Accordingly, base station 102 may be a portable user device such as a UE device in some circumstances.

Controller 204 includes any combination of hardware, software, and/or firmware for executing the functions described herein as well as facilitating the overall functionality of base station 102. An example of a suitable controller 204 includes code running on a microprocessor or processor arrangement connected to memory. Transmitter 206 includes electronics configured to transmit wireless signals. In some situations, transmitter 206 may include multiple transmitters. Receiver 208 includes electronics configured to receive wireless signals. In some situations, receiver 208 may include multiple receivers. Receiver 208 and transmitter 206 receive and transmit signals, respectively, through antenna 210. Antenna 210 may include separate transmit and receive antennas. In some circumstances, antenna 210 may include multiple transmit and receive antennas.

Transmitter 206 and receiver 208 in the example of FIG. 2A perform radio frequency (RF) processing including modulation and demodulation. Receiver 208, therefore, may include components such as low noise amplifiers (LNAs) and filters. Transmitter 206 may include filters and amplifiers. Other components may include isolators, matching circuits, and other RF components. These components in combination or cooperation with other components perform the base station functions. The required components may depend on the particular functionality required by the base station.

Transmitter 206 includes a modulator (not shown), and receiver 208 includes a demodulator (not shown). The modulator modulates the signals to be transmitted as part of a downlink signal and can apply any one of a plurality of modulation orders. The demodulator demodulates any uplink signals received at base station 102 in accordance with one of a plurality of modulation orders.

Figure 2B:
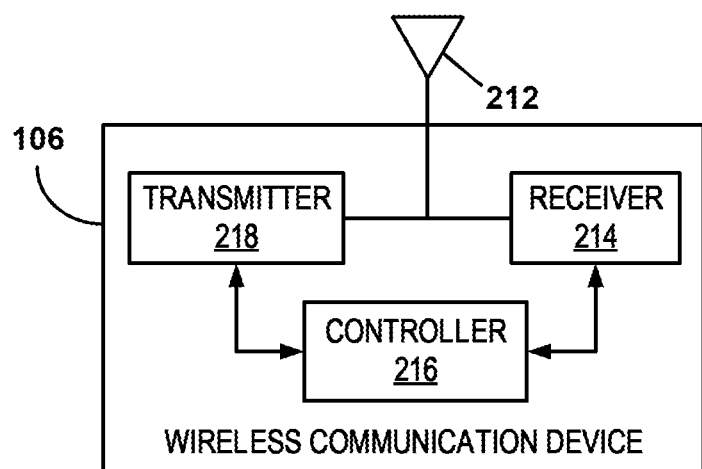
FIG. 2B is a block diagram of an example of the mobile wireless communication device shown in FIG. 1A.

As shown in FIG. 2B, mobile wireless communication device (WCD) 106 comprises controller 216, transmitter 218, and receiver 214, as well as other electronics, hardware, and code. WCD 106 may also be referred to herein as a PUE or simply as a user equipment device (UE). WCD 106 is wirelessly connected to a radio access network (not shown) via one or more base stations (not shown), which provide various wireless services to WCD 106. For the example shown in FIG. 1A, WCD 106 operates in accordance with at least one revision of the 3rd Generation Partnership Project 5G New Radio (3GPP 5G NR) communication specification. In other examples, WCD 106 may operate in accordance with other communication specifications.

WCD 106 is any fixed, mobile, or portable equipment that performs the functions described herein. The various functions and operations of the blocks described with reference to WCD 106 may be implemented in any number of devices, circuits, or elements. Two or more of the functional blocks may be integrated in a single device, and the functions described as performed in any single device may be implemented over several devices.

Controller 216 includes any combination of hardware, software, and/or firmware for executing the functions described herein as well as facilitating the overall functionality of a user equipment device. An example of a suitable controller 216 includes code running on a microprocessor or processor arrangement connected to memory. Transmitter 218 includes electronics configured to transmit wireless signals. In some situations, the transmitter 218 may include multiple transmitters. Receiver 214 includes electronics configured to receive wireless signals. In some situations, receiver 214 may include multiple receivers. Receiver 214 and transmitter 218 receive and transmit signals, respectively, through antenna 212. Antenna 212 may include separate transmit and receive antennas. In some circumstances, antenna 212 may include multiple transmit and receive antennas.

Transmitter 218 and receiver 214 in the example of FIG. 2B perform radio frequency (RF) processing including modulation and demodulation. Receiver 214, therefore, may include components such as low noise amplifiers (LNAs) and filters. Transmitter 218 may include filters and amplifiers. Other components may include isolators, matching circuits, and other RF components. These components in combination or cooperation with other components perform the user equipment device functions. The required components may depend on the particular functionality required by the user equipment device.

Transmitter 218 includes a modulator (not shown), and receiver 214 includes a demodulator (not shown). The modulator can apply any one of a plurality of modulation orders to modulate the signals to be transmitted by transmitter 218. The demodulator demodulates received signals, in accordance with one of a plurality of modulation orders.

In operation, base station 102 periodically transmits broadcast signal 104, which contains an indicator. In some examples, base station 102 can change the periodicity of the broadcast transmissions, based on the DRX cycle of a group of WCDs. For example, if one group of WCDs wake at time t1 and another group of WCDs wake up at time t2, base station 102 can selectively transmit broadcast signals 104 that correspond with time t1 for the first group of WCDs, with time t2 for the second group of WCDs, or both. In other examples, broadcast signal 104 is scheduled for transmission based on the DRX cycle of a particular WCD 106 since base station 102 is aware of when WCD 106 will wake from the IDLE state.

In some examples, the indicator indicates that WCD 106 is near a potential safety scenario. In other examples, the indicator indicates that WCD 106 should activate a collision-avoidance procedure.

In the example shown in FIG. 1A, base station 102 transmits, via cellular communication resources, broadcast signal 104 within first area 108. In some examples, broadcast signal 104 is part of a Synchronization Signal Block (SSB) comprising one or more broadcast signals. In other examples, broadcast signal 104 is a System Information Block (SIB) message.

In the examples in which broadcast signal 104 is part of an SSB, the indicator may be contained within a synchronization signal of the SSB. For example, a specific sequence with a specific offset for the primary synchronization signal (PSS) and/or the secondary synchronization signal (SSS) of the SSB could be transmitted as the indicator, in some examples. In other examples, the indicator may be contained within a physical broadcast channel (PBCH) transmission of the SSB. In these examples, the indicator could be transmitted within a specific field carried in the master information block (MIB) of the PBCH.

In examples in which broadcast signal 104 is a SIB message, the indicator may be contained in a System Information Block Type 1 (SIB1) message. The SIB1 message carries the remaining minimum system information that was not transmitted in the PBCH. In some examples, the SIB1 message is periodically broadcasted with a periodicity of 160 ms. However, a periodicity of 160 ms may cause excessive latency for some safety messaging applications. Thus, the periodicity of the SIB1 messaging may be reduced below 160 ms, in some examples.

In other examples in which broadcast signal 104 is a SIB message, the indicator may be contained in a SIB message other than a SIB1 message. In some examples, a SIB1 message directs WCD 106 to a subsequent SIB message that contains the indicator. In further examples, the SIB message containing the indicator is either broadcasted periodically or when requested by WCD 106.

In some examples, broadcast signal 104 is sent via a localized (e.g., beam-directed) transmission to first area 108. One example of a localized transmission would be a 5G NR beam-centric transmission to first area 108. In other examples, other beamforming techniques may be used to localize transmission of broadcast signal 104 within first area 108.

In other examples in which a device other than base station 102 is transmitting broadcast signal 104, broadcast signal 104 may transmitted by any other suitable wireless communication protocol. Examples of other suitable wireless communication protocols include, but are not limited to, D2D communication resources, Institute of Electrical and Electronics Engineers (IEEE) 802.11 (Wi-Fi), etc. In other examples, broadcast signal 104 may be transmitted from one or more of the following: a base station, a local remote radio head (RRH), a UE-type or gNB-type road side unit (RSU), a D2D-capable device, or any other suitable device.

As used herein, first area 108 is an area that is at least near a potential safety scenario (e.g., an intersection, a crosswalk, or any other location in which a vulnerable road user may experience a collision with a moving object that is using a roadway). Second area 112 is an area that at least partially overlaps with the potential safety scenario, itself. First area 108 and second area 112 may have any suitable size, shape, and location. Moreover, in some examples, first area 108 may overlap, at least partially, with the potential safety scenario and/or second area 112. As shown in the example of FIG. 1A, first area 108 is an area near a potential safety scenario (e.g., a crosswalk), and second area 112 is an area that overlaps with the potential safety scenario, itself. For the example shown in FIG. 1A, WCD 106 enters first area 108 and is moving towards second area 112, which is a potential safety scenario.

Upon entering first area 108 and waking from an IDLE state, WCD 106 receives broadcast signal 104, which contains an indicator, from base station 102. More specifically, upon waking from an IDLE state, WCD 106 begins searching for the SSBs of the serving cell and the neighboring cells. After WCD 106 has acquired the SSB of the serving cell, WCD 106 can receive SIB messages that correspond to the SSB of the serving cell.

Thus, in the examples in which the indicator is contained in an SSB, if WCD 106 detects the indicator in one of the detected SSBs, WCD 106 activates a collision-avoidance procedure. Alternatively, in the examples in which the indicator is contained in a SIB message, if WCD 106 detects the indicator in a SIB message that corresponds with the SSB of the serving cell, WCD 106 activates a collision-avoidance procedure.

In the examples in which broadcast signal 104 is part of an SSB, receiver 214 of WCD 106 may be further configured to receive the SSB before WCD 106 reaches second area 112. In the examples in which broadcast signal 104 is a SIB message, receiver 214 of WCD 106 may be further configured to receive the SIB message before WCD 106 reaches second area 112.

In this regard, the time duration between when WCD 106 enters first area 108 to the time when WCD 106 activates the collision-avoidance procedure depends upon the periodicity of the SSB broadcasts and the DRX cycle of WCD 106. Thus, first area 108 should cover an area that is large enough to ensure that a WCD 106 configured with a long DRX cycle will wake up to receive broadcast signal 104 at least once before reaching second area 112.

In response to receiving broadcast signal 104, WCD 106 activates a collision-avoidance procedure. As shown in FIG. 1A, the collision-avoidance procedure will help avoid a collision between WCD 106 and an approaching D2D-capable device 110.

As used herein, a D2D-capable device is any device that is capable of D2D communication. In some examples, D2D-capable device 110 is integrated into a vehicle, drone, robot, or the like as an onboard unit (OBU). In other examples, D2D-capable device 110 may simply be a user equipment (UE) device that is located within a vehicle, drone, robot, or the like. Some examples of user equipment devices include: a mobile phone, a transceiver modem, a personal digital assistant (PDA), or a tablet, for example. Any of the foregoing devices may also be referenced herein as vehicle UEs (VUEs).

Figure 1B:
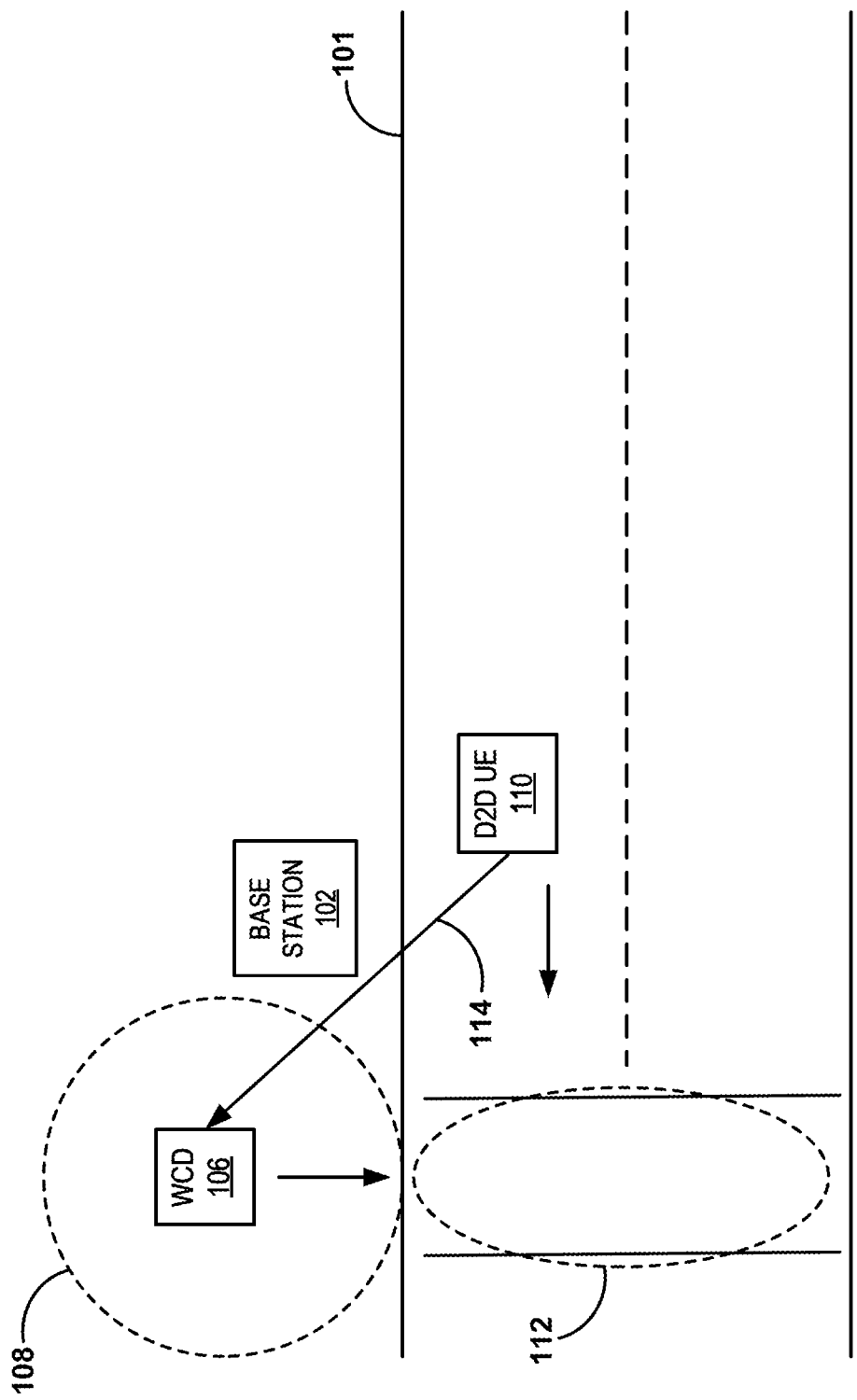
FIG. 1B is a block diagram of an example of a system in which the collision-avoidance procedure triggered in FIG. 1A includes sensing device-to-device (D2D) resources in order to detect D2D transmissions from an approaching D2D-capable device.

FIG. 1B is a block diagram of an example of a system in which the collision-avoidance procedure triggered in FIG. 1A includes sensing device-to-device (D2D) resources in order to detect D2D transmissions from an approaching D2D-capable device. For example, upon entering first area 108 and waking from an IDLE state, WCD 106 receives, via antenna 212 and receiver 214, broadcast signal 104 from base station 102. As mentioned above, broadcast signal 104 contains an indicator.

In response to receiving broadcast signal 104, WCD 106 utilizes controller 216 to activate a collision-avoidance procedure that includes sensing device-to-device (D2D) resources, using antenna 212 and receiver 214, in order to detect D2D transmissions 114 from approaching D2D-capable device 110. As used herein, the term "sensing" includes energy-detection and/or successful decoding of the received signal's control channel. In some examples, the D2D resources that are sensed/monitored include a D2D resource pool configured for communication between D2D-capable devices and mobile WCDs. In further examples, controller 216 of WCD 106 is also configured to place the mobile WCD 106 into a sleep state after sensing the D2D resources. In still further examples, controller 216 of WCD 106 is configured to refrain from placing mobile WCD 106 into a sleep state until after there is no longer a potential for a collision (e.g., the approaching D2D-capable device 110 and/or WCD 106 have moved past the potential safety scenario, the approaching D2D-capable device 110 and/or WCD 106 have changed directions, etc.).

In some examples, the received D2D transmissions 114 include safety message information that WCD 106 can utilize to avoid a collision with a vehicle in which D2D-capable device 110 is located. Examples of safety message information include: location and heading of D2D-capable device 110, estimated time before D2D-capable device 110 enters a potential safety scenario, etc. Upon receipt of D2D transmissions 114, WCD 106 alerts a user associated with WCD 106 that there is a potential for a collision with an approaching object on roadway 101. In some examples, an application running on WCD 106 could generate an audible and/or tactile alert when WCD 106 receives a safety message from D2D-capable device 110.

Figure 1C:
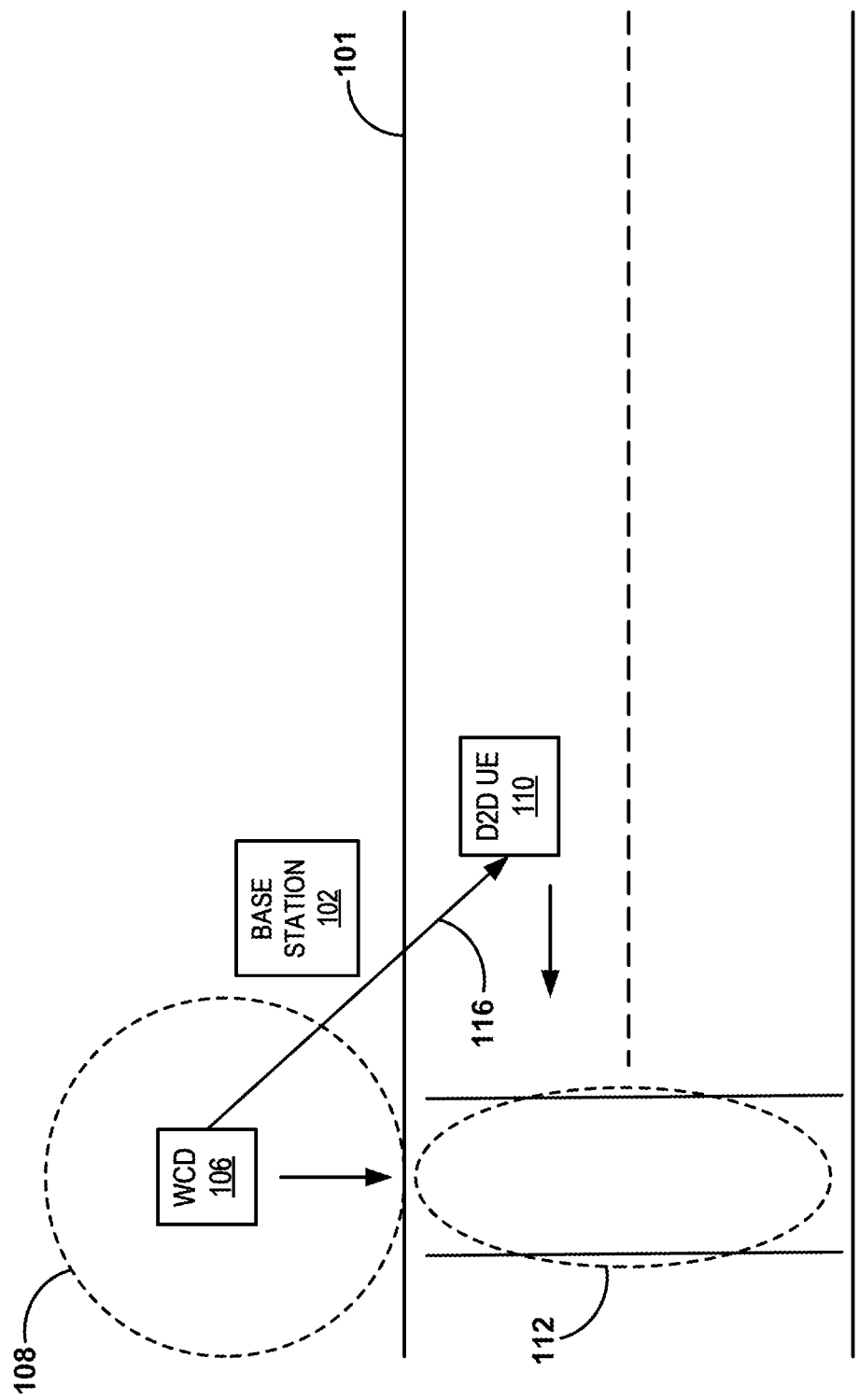
FIG. 1C is a block diagram of an example of a system in which the collision-avoidance procedure triggered in FIG. 1A includes transmitting, from the mobile wireless communication device, a periodic device-to-device (D2D) safety message using D2D resources.

FIG. 1C is a block diagram of an example of a system in which the collision-avoidance procedure triggered in FIG. 1A includes transmitting, from the mobile wireless communication device, a periodic device-to-device (D2D) safety message using D2D resources. For example, upon entering first area 108 and waking from an IDLE state, WCD 106 receives, via antenna 212 and receiver 214, broadcast signal 104 from base station 102. As mentioned above, broadcast signal 104 contains an indicator.

In response to receiving broadcast signal 104, WCD 106 utilizes controller 216 to activate a collision-avoidance procedure that includes transmitting, via transmitter 218 and antenna 212, periodic device-to-device (D2D) safety message 116 using D2D resources. In the example shown in FIG. 1C, WCD 106 transmits periodic D2D safety message 116 on the first available D2D communication resource. In some examples, periodic D2D safety message 116 includes location and heading information of the WCD 106. In other examples, periodic D2D safety message 116 may also include an estimated time when WCD 106 will enter a potential safety scenario. In further examples, transmitter 218 is configured to transmit periodic D2D safety message 116 before WCD 106 reaches second area 112. Upon receipt of periodic D2D safety message 116, D2D-capable device 110 can do one or more of the following: alert a user associated with D2D-capable device 110 that there is a potential for a collision with a vulnerable road user, and take action to prevent the collision (e.g., by braking, changing lanes, turning, etc., with or without user intervention).

Figure 3:
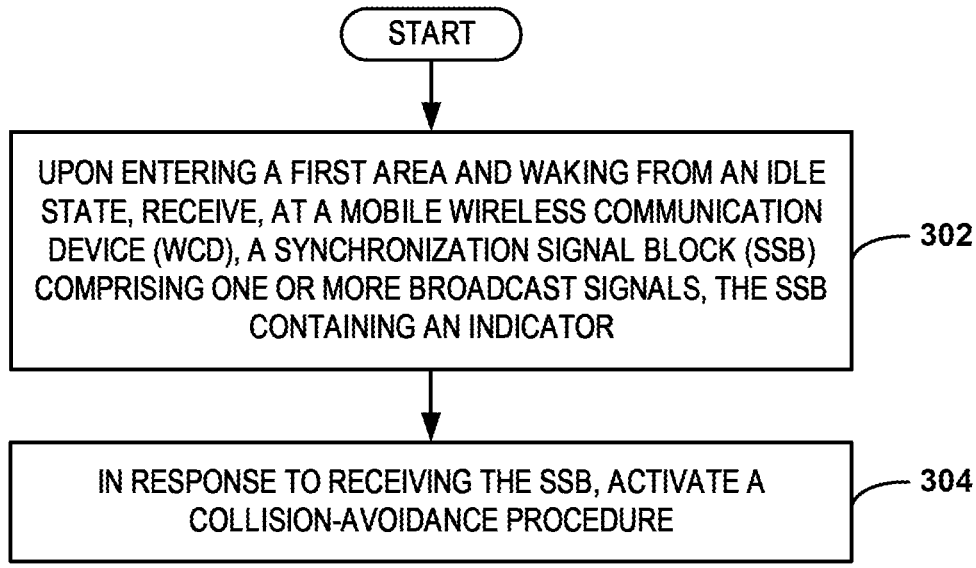
FIG. 3 is a flowchart of an example of a method of activating a collision-avoidance procedure in response to receiving a Synchronization Signal Block (SSB) containing an indicator.

FIG. 3 is a flowchart of an example of a method of activating a collision-avoidance procedure in response to receiving a Synchronization Signal Block (SSB) containing an indicator. The method 300 begins at step 302 with receiving at mobile WCD 106, upon entering first area 108 and waking from an IDLE state, a Synchronization Signal Block (SSB) comprising one or more broadcast signals. The SSB contains an indicator. At step 304, WCD 106 activates, in response to receiving the SSB, a collision-avoidance procedure. In some examples, the collision-avoidance procedure includes transmitting a periodic device-to-device (D2D) safety message using D2D resources. In further examples, the collision-avoidance procedure includes sensing device-to-device (D2D) resources in order to detect D2D transmissions from an approaching D2D-capable device. In other examples, one or more of the steps of method 300 may be omitted, combined, performed in parallel, or performed in a different order than that described herein or shown in FIG. 3. In still further examples, additional steps may be added to method 300 that are not explicitly described in connection with the example shown in FIG. 3.

Figure 4:
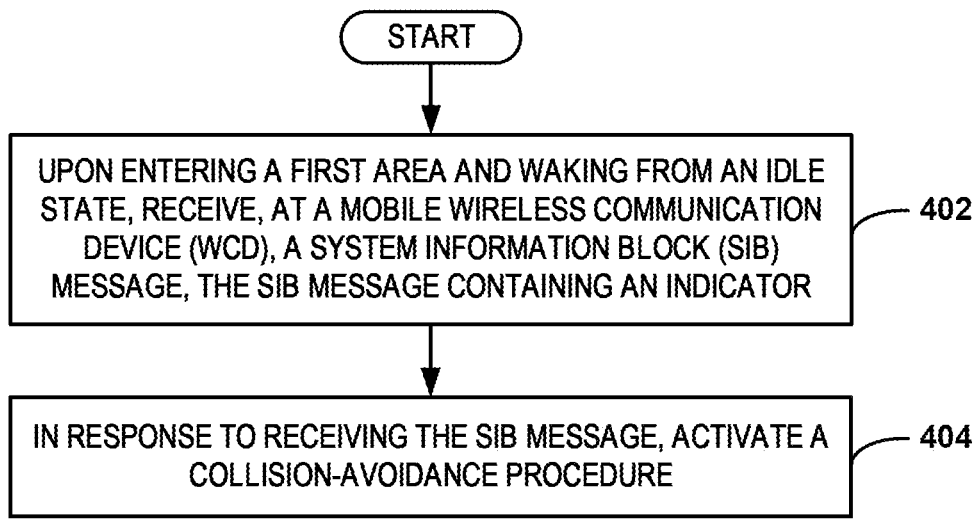
FIG. 4 is a flowchart of an example of a method of activating a collision-avoidance procedure in response to receiving a System Information Block (SIB) message containing an indicator.

FIG. 4 is a flowchart of an example of a method of activating a collision-avoidance procedure in response to receiving a System Information Block (SIB) message containing an indicator. The method 400 begins at step 402 with receiving at mobile WCD 106, upon entering first area 108 and waking from an IDLE state, a System Information Block (SIB) message. The SIB message contains an indicator. At step 404, WCD 106 activates, in response to receiving the SIB message, a collision-avoidance procedure. In some examples, the collision-avoidance procedure includes transmitting a periodic device-to-device (D2D) safety message using D2D resources. In further examples, the collision-avoidance procedure includes sensing device-to-device (D2D) resources in order to detect D2D transmissions from an approaching D2D-capable device. In other examples, one or more of the steps of method 400 may be omitted, combined, performed in parallel, or performed in a different order than that described herein or shown in FIG. 4. In still further examples, additional steps may be added to method 400 that are not explicitly described in connection with the example shown in FIG. 4.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A mobile wireless communication device comprising:
   a receiver configured to receive, upon entering a first area and waking from an IDLE state, a Synchronization Signal Block (SSB) comprising one or more broadcast signals, the SSB containing an indicator; and
   a controller configured to activate, in response to receiving the SSB, a collision-avoidance procedure.

2. The mobile wireless communication device of claim 1, wherein the indicator is contained within a synchronization signal of the SSB.

3. The mobile wireless communication device of claim 1, wherein the indicator is contained within a physical broadcast channel (PBCH) transmission of the SSB.

4. The mobile wireless communication device of claim 1, wherein the SSB is beam-directed to the first area.

5. The mobile wireless communication device of claim 1, wherein the receiver is further configured to receive the SSB before the mobile wireless communication device reaches a second area.

6. The mobile wireless communication device of claim 1, further comprising:
   a transmitter configured to transmit, as part of the collision-avoidance procedure, a periodic device-to-device (D2D) safety message using D2D resources.

7. The mobile wireless communication device of claim 6, wherein the safety message includes location and heading information of the mobile wireless communication device.

8. The mobile wireless communication device of claim 1, wherein the receiver is further configured to sense, as part of the collision-avoidance procedure, device-to-device (D2D)

resources in order to detect D2D transmissions from an approaching D2D-capable device.

9. A mobile wireless communication device comprising:
   a receiver configured to receive, upon entering a first area and waking from an IDLE state, a System Information Block (SIB) message, the SIB message containing an indicator; and
   a controller configured to activate, in response to receiving the SIB message, a collision-avoidance procedure.

10. The mobile wireless communication device of claim 9, wherein the SIB message is a System Information Block Type 1 (SIB1) message.

11. The mobile wireless communication device of claim 9, wherein the SIB message is beam-directed to the first area.

12. The mobile wireless communication device of claim 9, wherein the receiver is further configured to receive the SIB message before the mobile wireless communication device reaches a second area.

13. The mobile wireless communication device of claim 9, further comprising:
   a transmitter configured to transmit, as part of the collision-avoidance procedure, a periodic device-to-device (D2D) safety message using D2D resources.

14. The mobile wireless communication device of claim 13, wherein the safety message includes location and heading information of the mobile wireless communication device.

15. The mobile wireless communication device of claim 9, wherein the receiver is further configured to sense, as part of the collision-avoidance procedure, device-to-device (D2D) resources in order to detect D2D transmissions from an approaching D2D-capable device.

16. A mobile wireless communication device comprising:
   a receiver configured to receive, upon entering a first area and waking from an IDLE state, a paging message containing an indicator;
   a transmitter; and
   a controller configured to activate, in response to receiving the paging message, a collision-avoidance procedure that includes transmitting, from the transmitter, a periodic device-to-device (D2D) safety message using D2D resources.

17. The mobile wireless communication device of claim 16, wherein the safety message includes location and heading information of the mobile wireless communication device.

* * * * *